United States Patent
Yagi et al.

[11] 4,017,
[45] Apr. 12, 1

[54] LIQUID CRYSTAL DISPLAY DEVICE

[75] Inventors: Kenjiro Yagi, Tokyo; Yuji Koike, Matsudo; Hirotomo Hirai, Tokyo, all of Japan

[73] Assignee: Kabushiki Kaisha Daini Seikosha, Japan

[22] Filed: Sept. 6, 1974

[21] Appl. No.: 503,610

[30] Foreign Application Priority Data

Sept. 7, 1973 Japan .............................. 48-100898
Sept. 21, 1973 Japan ........................ 48-110675[U]
Sept. 21, 1973 Japan ........................ 48-110676[U]

[52] U.S. Cl. .................... 350/160 LC; 40/130 K; 240/1 EL
[51] Int. Cl.² .......................................... G02F 1/13
[58] Field of Search ........... 350/160 LC; 40/130 K; 240/1 EL, 2 AT

[56] References Cited

UNITED STATES PATENTS

| | | | |
|---|---|---|---|
| 2,247,969 | 7/1941 | Stewart | 40/130 K X |
| 2,831,453 | 4/1958 | Hardesty | 40/130 K X |
| 3,262,224 | 7/1966 | Hardesty | 40/130 K |
| 3,328,570 | 6/1967 | Balchunas | 240/1 EL X |
| 3,653,138 | 4/1972 | Cooper | 350/160 LC UX |
| 3,881,809 | 5/1975 | Ferguson et al. | 350/160 LC |

OTHER PUBLICATIONS

Bush, "Liquid Crystal Display Device," IBM Discl. Bull., vol. 14, No. 1, p. 223, June 1971.
Young, "Combination Reflective/Transmissive L Crystal Display," IBM Tech. Discl. Bull., vol. 15, N pp. 2435–2436, Jan. 1973.

*Primary Examiner*—John K. Corbin
*Assistant Examiner*—Matthew W. Koren
*Attorney, Agent, or Firm*—Robert E. Burns; Emma J. Lobato; Bruce L. Adams

[57] ABSTRACT

A liquid crystal display device includes a display [ comprised of upper and lower transparent plates ing a liquid crystal material sandwiched therebetw A reflecting plate having a roughened upper surfa disposed beneath the lower transparent plate witl roughened surface facing the lower transparent p A light source is located alongside one side edge o reflecting plate and coacts with a light-reflecting l which encases the display panel, light source anc flecting plate to direct the light emitted from the source throughout all portions of the display pane locating the light source along the side of the reflec plate and by employing the light reflecting hood, resultant liquid crystal display device may be n very thin and therefore suitable for use in v watches.

7 Claims, 6 Drawing Figures

LIQUID CRYSTAL DISPLAY DEVICE

BACKGROUND OF THE INVENTION

This invention relates to a liquid crystal display device incorporating therein an illumination lamp.

A liquid crystal display device is suitable for use as a display device of a wrist watch because it is easy to make and can be made very thin, and the power consumption is comparatively low. However, since liquid crystal material does not itself emit light, the display can not be seen very well at a dark place. The display can be read out by reflecting light provided by an outside light source.

In order to read out the display at a dark place, particularly at night, a light source must be incorporated into the display device.

There are two types of illumination means for illuminating the liquid crystal material, the light transmission type and light reflecting type. In the display device of the former, the light source is located at the back thereof so that light is transmitted directly through the liquid crystal material, on the other hand, in the display device of the light reflecting type, the light source is located at the front thereof and reflected back into the liquid crystal material. However, the construction of these display devices has the defect of increasing the overall thickness of the device thereby making them less suitable for use in small wrist watches.

SUMMARY OF THE INVENTION

According to this invention, a liquid crystal display device suitable for use in a wrist watch has a display which can be read out in a dark place and includes a lamp disposed at the side of the display panel as opposed to the front or back.

Illumination efficiency is heightened by employing a focusing hood which covers the lamp with the lamp being positioned at the focal point of the hood and being connected to lead wires extending through a hole in the hood.

It is easier to read the display according to the invention at a dark place because it includes a light-distributing device which distributes light all over the display panel.

Therefore the primary object of this invention is to provide a liquid crystal display device having illumination means built therein without increasing the thickness of the device.

Another object of the invention is to heighten the efficiency of the illumination means incorporating a focusing hood which covers a lamp and a reflecting plate built into the display device.

A still further object of the invention is to obtain uniform illumination all over the display panel incorporating a light-distributing device into the display device.

The foregoing objects and other objects as well as the characteristic features of the invention will become more apparent and more readily understandable by the following description and the appended claims when read in conjunction with the accompanying drawings.

DETAILED DESCRIPTION OF THE INVENTION

Figure 1:
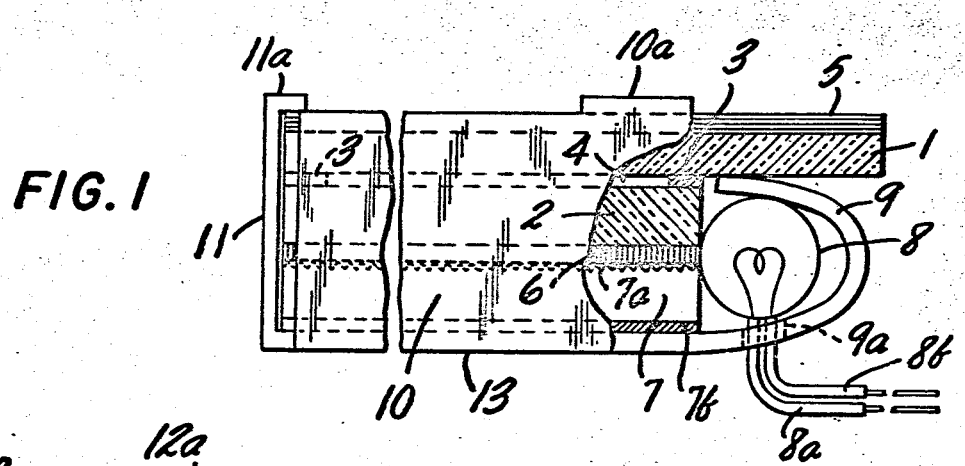
FIG. 1 is a cross-sectional view of a liquid crystal display device according to the invention.

In FIG. 1, transparent glass plates 1 and 2 are disposed in parallel with an intervening spacer 3 therebetween, and nematic-phase liquid crystal material 4 with a positive dielectric anisotropy is filled in this space. A transparent electrode (not shown) is formed on the surface of said glass plates 1 and 2 where they contact with said liquid crystal material 4.

A polarizer 5 is disposed on the glass plate 1 and a crossed analyzer 6 is disposed under the glass plate 2. Moreover, a transparent relecting plate 7 made of a material having a high refractive index is disposed under the analyzer 6. At the bottom of the reflecting plate 7, metallic film 7b such as silver or aluminum which reflects light is coated by vacuum evaporation and a roughened surface 7a which scatters light is located at the top of the plate 7 by fluid horning or chemical etching.

A source of illumination comprising a lamp 8 is disposed at the side of the display panel and beneath the glass plate 1 as shown in FIG. 1. A focusing hood 9 is disposed behind the lamp 8 to heighten the illumination effect by reflecting and redirecting the light towards the glass plate 2. It is made of a thin plate such as Be-Cu alloy or phosphor bronze and has a parabolic surface with the lamp 8 being positioned at the focal point thereof. The hood 9 is treated with heat to impart thereto elasticity, after which it is plated with nickel or silver to give it a good reflecting surface for light. Lamp 8 is positioned and fixed at the appropriate place in the hood 9 and lead wires 8a and 8b extend through a hole 9a in the hood 9.

Figure 2:
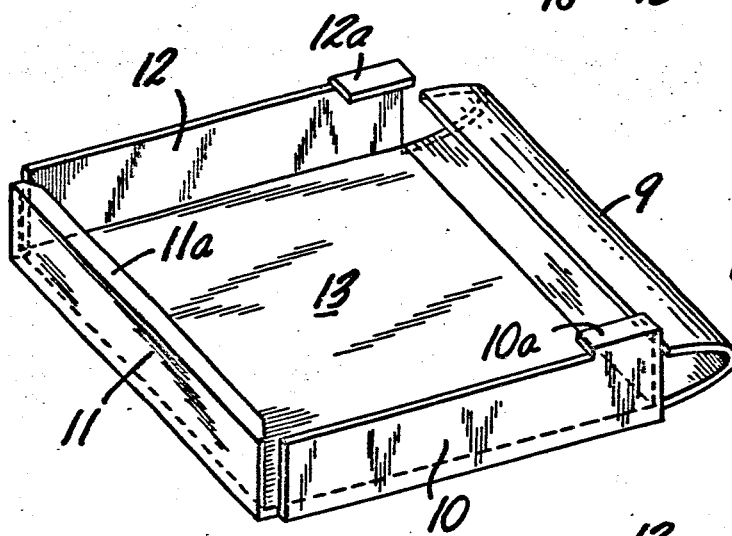
FIG. 2 is a perspective view of a reflecting device.
Figure 3:
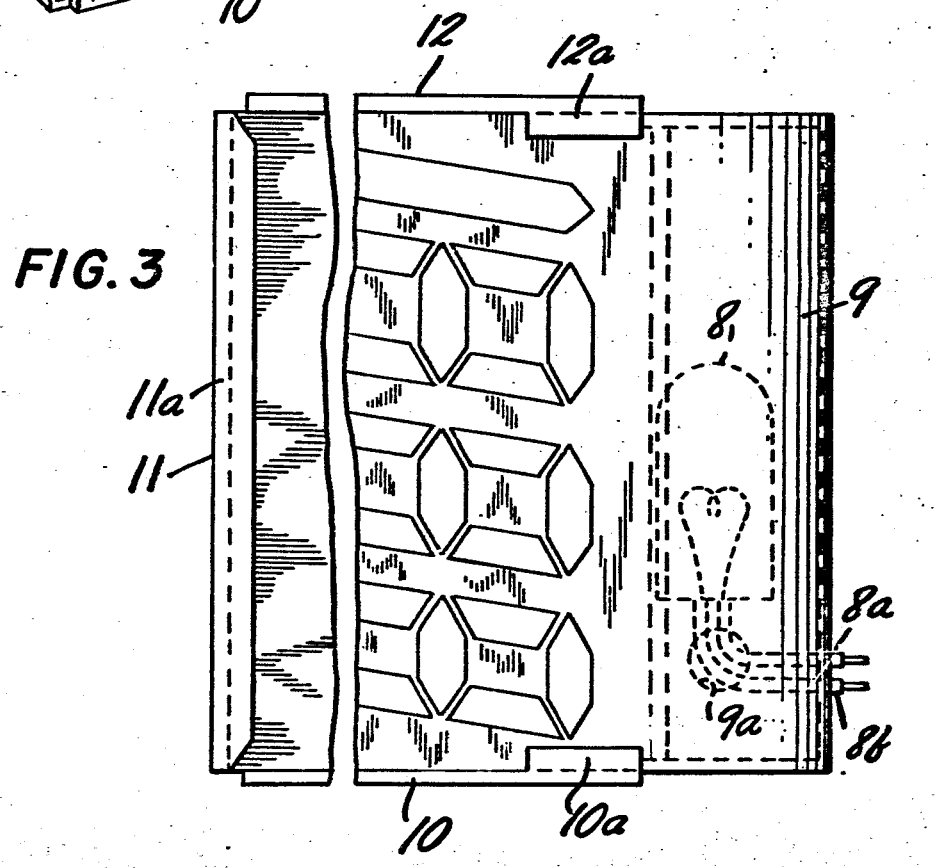
FIG. 3 is a plan view of the display device shown in FIG. 1.

The display panel has side reflecting plates 10, 11, 12 and a bottom reflecting plate 13 all of which are plated like the hood 9. In the embodiment shown in FIG. 2 they are all constructed from one sheet of thin metal plate, but they can also be constructed as separate parts. Each side reflecting plate 10, 11, 12 has a projection 10a, 11a, 12a respectively, which is bent over as shown in the drawings so as to receive and hold a liquid crystal display panel. The overall liquid crystal display device constructed in this fashion is shown in FIG. 3.

When the lamp 8 is turned on, the light therefrom enters into the display panel from the side of the glass plate 2 and the reflecting plate 7. Since the lamp 8 is located at the focus of the hood 9, almost every incident light beam is parallel to the glass plate 2.

Incident light entering the side of the reflecting plate 7 is reflected by metallic film 7b, by each side reflecting plate 10, 11, 12 and by the bottom reflecting plate 13. This reflected light is scattered by the roughened surface 7a. Scattered light may reach an observer via the analyzer 6, the glass plate 2, liquid crystal 4, the glass plate 1 and the polarizer 5 together with direct light from the glass plate 2. This causes the display panel to become brighter so that the display can be seen at a dark place.

If desired, either the bottom reflecting plate 13 or the reflecting mirror surface 7b may be eliminated without much of a loss in the illumination effect.

Figure 4:
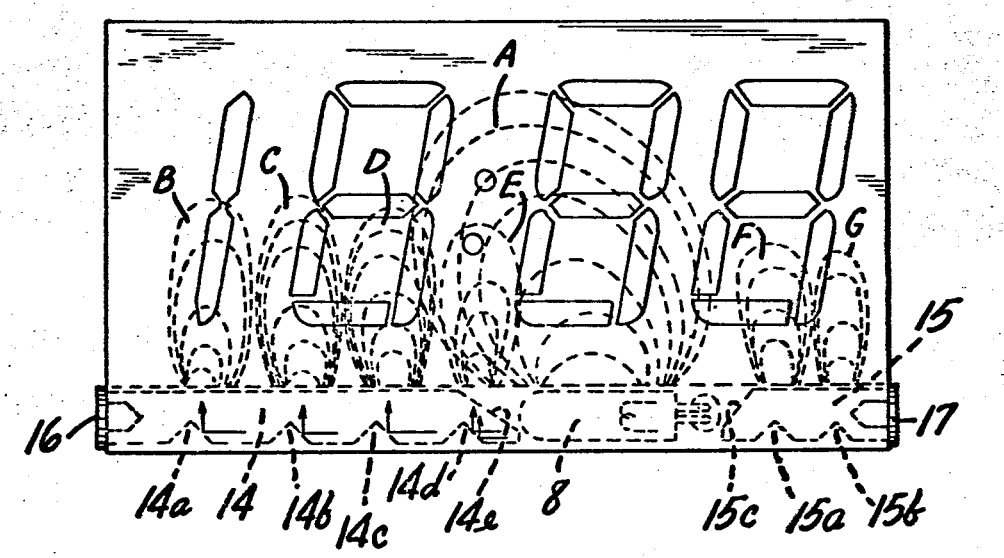
FIG. 4 is a plan view of another embodiment of the invention incorporating a light-distributing device, and shows light distribution at the same time.

FIG. 4 is a plan view showing another embodiment of the invention which incorporates light-distributing means at the bottom of the display panel to improve the light distribution. The rest of the parts are similar to those of the above mentioned display device.

The light-distributing means comprises devices 14 and 15 disposed at both sides of a lamp 8 although the device 15 may be eliminated as the case may be. They are made of material having the properties of high transmission for light and good workability such as Acril resin.

Figure 5:
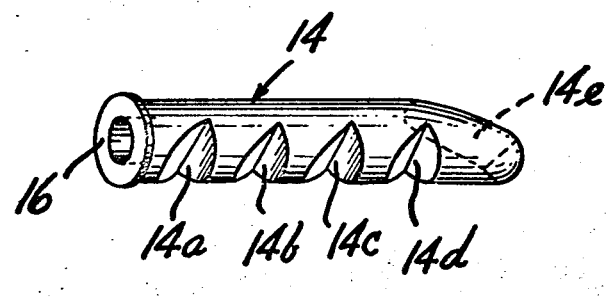
FIG. 5 is a perspective plan view showing a light-distributing device.

The device 14 has a plurality of cut out portions 14a – 14d which are aligned with one another, and one end portion 14e may be cut as shown in FIG. 5. The device 15 is also made like the device 14.

Figure 6:
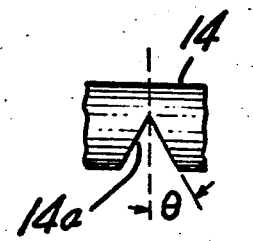
FIG. 6 shows cutting angle of the cut out portion which is made on the light-distributing device.

The cross-section of each cut out portion is V shaped as shown in FIG. 6. The cutting angle $\theta$ is determined by the particular material which is used for the devices 14 and 15. For example, in the case of Acril resin, the critical light refraction angle from the inside to the outside of the device is about 42°.

Therefore assuming that incident light from the lamp 8 to the device 14 is parallel to the longitudinal axis of the device 14 and suppose that said cutting angle $\theta$ is more than 42°, incident light striking the incident surface will be wholly reflected as depicted by the solid arrows in FIG. 4. Then it is practical to determine, in case of Acril resin, that the cutting angle $\theta$ is about 45°.

All of the reflecting surfaces of the devices 14 and 15 must be polished and have a mirrorlike finish. Otherwise, if they had roughened surfaces, the incident light would be scattered and the illumination effect would be reduced by half.

At the other end of the devices 14 and 15 are provided stoppers 16 and 17 made of polished metal respectively. They are provided for reflecting the light again which passes through the respective devices 14 and 15.

The cut out portions are V shaped in this embodiment, however, the invention is not limited to a V shape. They may be replaced alternatively by other shapes such as circular shape or curved shape.

With reference again to FIG. 4, when the lamp 8 is turned on, the light is distributed as represented the dotted lines A – G. The dotted line A shows direct light distribution from the lamp 8, and the dotted lines B – G show the reflected light distribution caused by the cut out portions of the devices 14 and 15.

As may be seen in FIG. 4, the liquid crystal display device incorporating the light-distributing devices effectively distribute light to almost every area of the display panel. Illumination efficiency is superior to that of a conventional display device without using such a device.

While preferred embodiments of the invention have been shown and described it will be understood that many modifications and changes can be made within the true spirit and scope of the invention.

We claim:

1. A liquid crystal display device suitably thin and compact for use in wrist watches and the like comprising: a display panel comprised of upper and lower transparent plates having liquid crystal material sandwiched therebetween; a reflecting plate disposed beneath said lower transparent plate and having a roughened upper surface facing said lower transparent plate; an energizeable light source disposed laterally adjacent one side edge of said reflecting plate and positioned to direct light when said light source is energized through said reflecting plate; and light-distributing means substantially encasing said display panel, reflecting plate and light source except for said upper transparent plate and forming therewith a thin and compact liquid crystal display device for effectively distributing the light emitted by said light source into said reflecting plate and throughout said display panel, said light-distributing means including means located alongside said light source and extending along said one side edge of said reflecting plate for reflecting light at discrete points therealong into said reflecting plate.

2. A liquid crystal display device according to claim 1; wherein said light-distributing means includes a focussing hood having bottom and side walls, the inner surfaces of said bottom and side walls being coated with a light-reflecting material and the side wall portion adjacent said light source being curved to reflect light emitted by said light source towards said one side edge of said reflecting plate.

3. A liquid crystal display device according to claim 2; wherein the curved side wall portion is curved in the shape of a parabolic reflector having a given focal point; and wherein said light source is positioned at said focal point so that light reflected by said parabolic reflector enters said reflecting plate substantially parallel to the major axis thereof.

4. A liquid crystal display device according to claim 3; wherein said curved side wall portion has an opening therein; and said light source includes a set of lead wires extending through said opening.

5. A liquid crystal display device according to claim 2; wherein said light-distributing means includes a coating of light-reflecting material on the lower surface of said reflecting plate.

6. A liquid crystal display device according to claim 2; further including a polarizer and a crossed analyzer spaced apart from one another and having sandwiched therebetween in superposed relationship said display panel.

7. A liquid crystal display device according to claim 1; wherein said means for reflecting light at discrete points therealong into said reflecting plate comprises an elongated body composed of a material which is transmissive to light and having at spaced locations therealong cut-outs on the side of said elongated body opposite said one side edge of said reflecting plate, said cut-outs having a cutting angle greater than the critical light refraction angle for that material so that light propagating interiorly of and longitudinally along said elongated body and striking the cut-out surfaces will be reflected back through said elongated body toward said one side edge of said reflecting plate.

* * * * *